Figure 1:
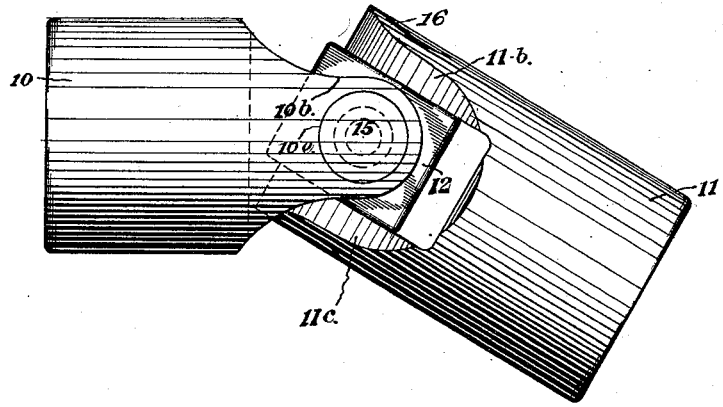

No. 658,065. Patented Sept. 18, 1900.
J. JETTER.
UNIVERSAL JOINT.
(Application filed May 16, 1900.)

(No Model.)

Witnesses:
George Mortson
Janette S. Ellsworth.

Inventor:
Julius Jetter.
By his Attorney,
Ed. E. Claussen.

THE NORRIS PETERS CO., PHOTO-LITHO., WASHINGTON, D. C.

UNITED STATES PATENT OFFICE.

JULIUS JETTER, OF HARTFORD, CONNECTICUT, ASSIGNOR TO FRANK E. BOCORSELSKI, OF SAME PLACE.

UNIVERSAL JOINT.

SPECIFICATION forming part of Letters Patent No. 658,065, dated September 18, 1900.

Application filed May 16, 1900. Serial No. 16,876. (No model.)

*To all whom it may concern:*

Be it known that I, JULIUS JETTER, a citizen of the United States of America, and a resident of Hartford, county of Hartford, and State of Connecticut, have invented certain new and useful Improvements in Universal Joints, of which the following is a specification.

This invention relates to improvements in universal joints, or, as sometimes termed, "knuckle-joints" and pertains more particularly to the construction of the pivots and the block and the means whereby these pivots act as ties, thereby preventing the forked members of the coupling-heads of the universal joints from spreading, and thereby maintaining the axial alinement of the coöperating parts.

The object of my invention is to provide a universal joint capable of transmitting a greater amount of power at a greater angle and at a greater speed than has heretofore been accomplished.

The novelty of the construction and the organization of the several parts are illustrated in the drawings forming a part of this specification, wherein—

Figures 2, 3:
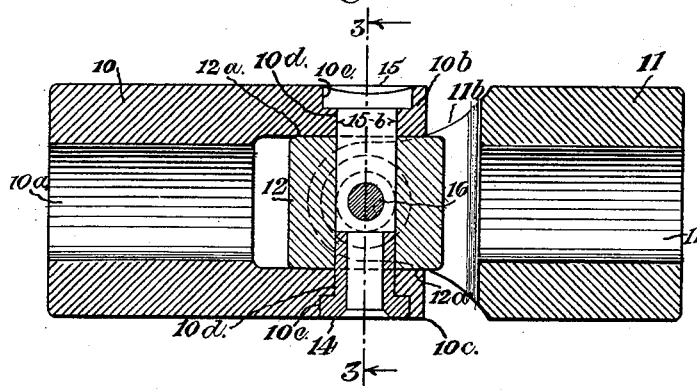
Figures 4, 5, 6:
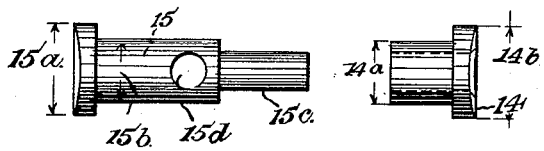
Figures 7, 8:
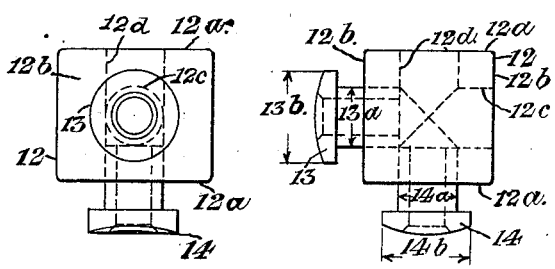

Figure 1 is an outside view of my improved universal joint, the same being drawn at an angle of thirty degrees, which is about the largest angle at which a universal joint can be operated to advantage. Fig. 2 represents a section on the longitudinal median line, showing the bolt in full view. Fig. 3 is a cross-sectional end view on the line 3 3 and shown in the direction of the arrows of Fig. 2. Figs. 4, 5, and 6 respectively represent outside views of the bolts and the bushing. Figs. 7 and 8 are respectively a front and end view of the block, showing the bushings in their proper positions as used in my universal joint.

Similar numerals indicate like parts in all of the drawings.

In the preferred embodiment of my invention herein shown and described the universal joint comprises two coupling-heads which may be of any suitable construction adapted to receive the ends of the shafts and each provided with forked members, between which is suitably held the block, the inner surfaces of the members forming suitable bearing-surfaces for the block, two bushings rigidly forced into two adjacent sides of the block, and bolts passing through the bushings and the forked members of the coupling-heads, means for securing the bolts in their proper positions and for effectively preventing the spreading of the forked members, and thereby maintaining the axial alinement of the bolts and the forked members of the heads.

In the form herein shown and described my universal joint consists of the two coupling-heads 10 and 11, provided with holes $10^a$ and $11^a$, respectively, adapted to receive the ends of the shafts, by means of which the motion and power are transmitted, and also provided with the forked members $10^b$ $10^c$ and $11^b$ $11^c$, respectively. The forked members are provided with holes $10^d$ and $11^d$, which are counterbored with enlarged recesses $10^e$ and $11^e$, respectively, and are in substantial axial alinement with one another. The block 12, which is preferably square in cross-section, is interposed between the two forked members of the head and is so fitted that the surfaces $12^a$ and $12^b$ move freely with the least possible frictional resistance against the inner surfaces of the forked members $10^b$ and $10^c$ and $11^b$ and $11^c$, respectively. The block 12 is also provided with two circular openings $12^c$ and $12^d$ of exact size and in precisely the same plane, but at ninety degrees with one another, as clearly shown in Figs. 2, 3, 7, and 8. This block is adapted to receive on two adjacent sides the bushings 13 and 14, which form the pivotal connection with one member of each of the coupling-heads, and they are rigidly driven into the openings $12^c$ and $12^d$, respectively, to a certain depth, the balance of the openings being filled by the bolts 15 and 16, as will be explained later. The diameters $14^a$ and $14^b$ of the bushing 14 are slightly smaller than the hole $10^d$ and the counterbored recess $10^e$ of the forked member $10^c$, and the diameters $13^a$ and $13^b$ of the bushing 13 are also slightly smaller than the hole $11^d$ and the counterbored recess $11^e$ of the forked member $11^c$. In practice I prefer to make the difference of the respective holes above referred to and bushing about one-thousandth of an inch, so as to be sure of the least amount of friction between these bushings and the forked members. The pivotal connection of each of the other forked members of the coupling-heads will now be described, and consists of the bolts 15 and 16, and these bolts also serve the purpose of holding the forked members $10^b$ $10^c$ and $11^b$ $11^c$ together. The bolt 15 passes through the forked member $10^b$, the block 12, and the bushing 14, and the head of that bolt $15^a$ is slightly smaller than the counterbored recess $10^e$, and the body of the same, $15^b$, is also slightly smaller than the hole $10^d$ of the forked member $10^b$; but the body $15^b$ of that bolt fits tightly and is held rigidly in the circular opening $12^d$ of the block 12. The shouldered stem $15^c$ of the bolt 15 passes through the central hole of the bushing 14 and, as shown in the drawings, which represent the preferred embodiment of my invention, is riveted over upon the bushing 14. The bolt 15 is also provided with a hole $15^d$, the purpose of which will be described later.

To prevent the forked members $11^b$ and $11^c$ from spreading, I have provided the bolt 16, the diameter of the head $16^b$ and the diameter of the body $16^b$ being slightly less than that of the counterbored recess $11^e$ and the hole $11^d$, respectively, of the forked member $11^b$; but the body $16^b$ fits rigidly into the circular opening $12^c$ of the block 12. The stem $16^c$ of the bolt 16 fits into the hole $15^d$, as previously described, and also fits tightly into the bushing 13 and, as shown, is riveted over at the end.

I have preferably shown the bolts 15 and 16 as being riveted over to present a smooth outside appearance; but I do not wish to limit the scope of my invention to this mode of securing the ends thereof, as a nut threaded to the ends of the stems $15^c$ and $16^c$ would answer equally well, or other methods can be used as well.

In assembling the universal joint proper care should be taken that the heads of the bolts 15 and 16 sit properly down on the bottom of the recess $10^e$ and $11^e$, respectively.

I do not desire broadly to claim a universal joint consisting of two cylindrical shaft-sections of uniform diameter from end to end and each having an integral fork at the inner end thereof, the outer faces of the prongs of which are disposed in a common arc coincident with the circumferential arc of the body portion of said section, two concentric members, one of which extends through the other and is connected at its ends to the prongs of one fork, and a cylindrical member extending through the concentric members and having its ends connected to the prongs of the other fork, as I am aware that this is the invention of Frank E. Bocorselski and constitutes the subject-matter of one claim of an application for Letters Patent filed by him June 18, 1900, Serial No. 20,703. Neither do I desire to claim the specific subjects-matter of the other claims in his application; but, on the contrary, I only desire to cover the specific constructions, including the two bushings rigidly supported in the block, substantially as set forth in the claims of this application.

Having described my invention, I claim—

1. In a universal joint, the combination of the coupling-heads, each provided with forked members, a block interposed between the forked members of the coupling-heads, two bushings rigidly supported in openings at two adjacent sides of the block, the axes of the bushings intersecting at right angles with one another, bolts passing through the forked members, block and bushing, substantially as described.

2. In a universal joint, the combination of the coupling-heads, each provided with forked members, a block interposed between the forked members of the coupling-heads, two bushings rigidly supported in openings at two adjacent sides of the block, the axes of the bushings intersecting at right angles with one another, bolts passing through the forked members, block and bushing, and having their ends riveted over upon the bushing, substantially as described.

3. A universal joint consisting of the combination of the coupling-heads, having forked members integral with the coupling-heads, a block interposed and fitting substantially as described between the forked members, bushings rigidly supported in the block, the bolt 15 provided with the opening, the bolt 16 passing through the opening of the bolt 15, and means for securing the ends of the bolts for the purpose specified.

4. A universal joint consisting of the combination of the coupling-heads, having forked members integral with the coupling-heads, a block interposed and fitting substantially as described between the forked members, bushings rigidly supported in the block, and having their axes intersecting at ninety degrees with one another, bolts passing through the openings of each one of the forked members of the coupling-heads and the block, and forming pivotal connections, the bushing forming the pivotal connection between the other forked members and the block, all combined and operating substantially as described.

5. A universal joint consisting of the combination of the coupling-heads, having forked members integral with the coupling-heads, a block interposed and fitting substantially as described between the forked members, bushings rigidly supported in the block and having their axes intersecting at ninety degrees with one another, bolts rigidly supported in the block, each bolt with its corresponding bushing forming the pivotal connection between the two forked members of the coupling-head and the block, and each bolt having its end riveted over upon its bushing, substantially as described.

6. A universal joint consisting of the combination of the coupling-heads, having forked members integral with the coupling-heads, a block interposed and fitting substantially as described between the forked members, bushings rigidly supported in the block and forming the pivotal connection between one forked member of each of the coupling-heads, the axes of the bushings intersecting at ninety degrees with one another, bolts rigidly supported in the block and forming the pivotal connection between the other forked members of the coupling-heads, the axes of the bolts coinciding with the axes of the bushings, and the ends of the bolts riveted over to prevent the forks from spreading, substantially as described and for the purpose set forth.

Signed by me at Hartford, Connecticut, this 14th day of May, 1900.

JULIUS JETTER.

Witnesses:
ED. E. CLAUSSEN,
J. S. ELLSWORTH.